Figure 1:
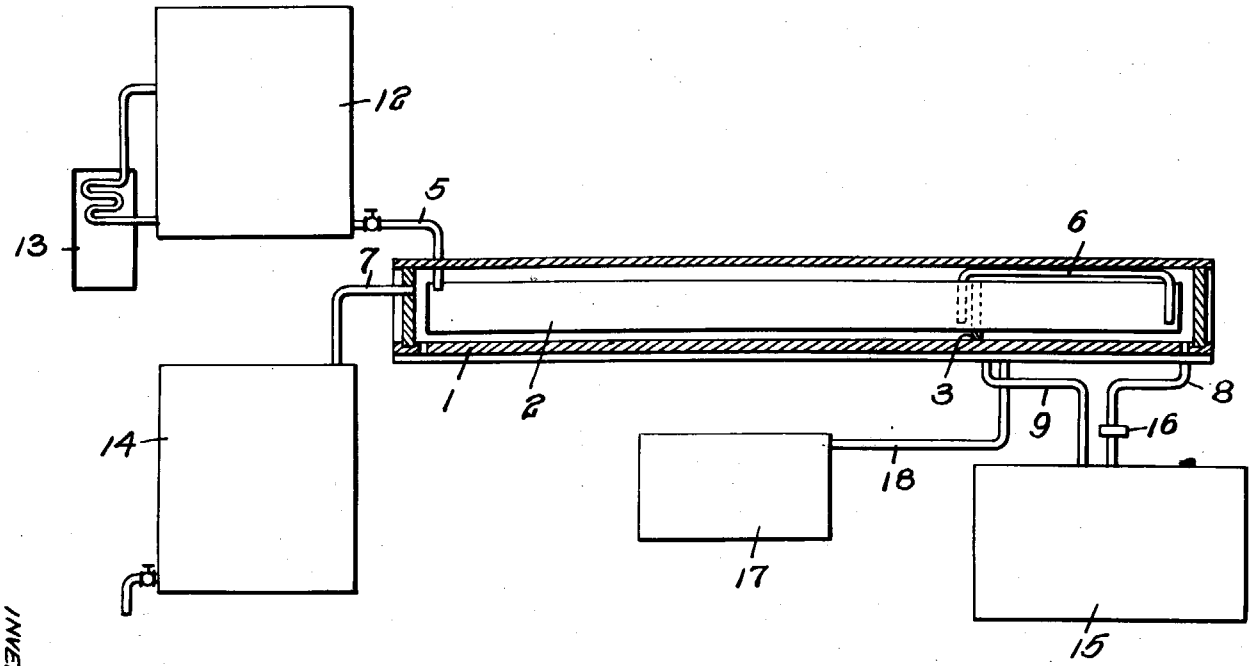
Figure 2:
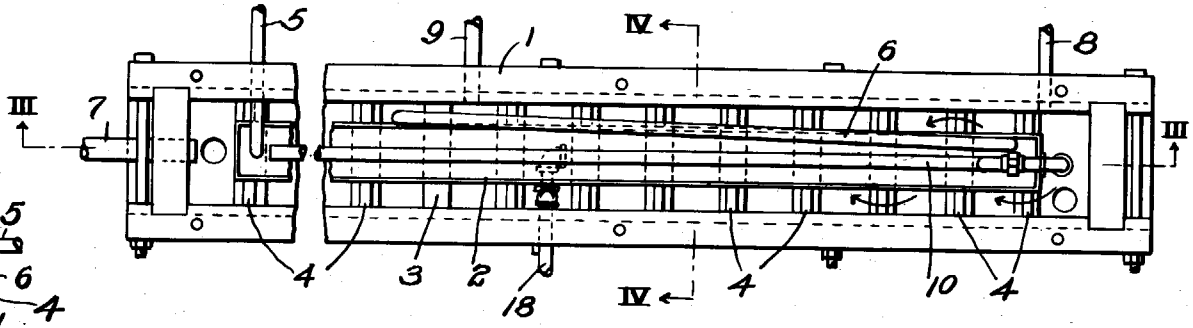
Figure 3:
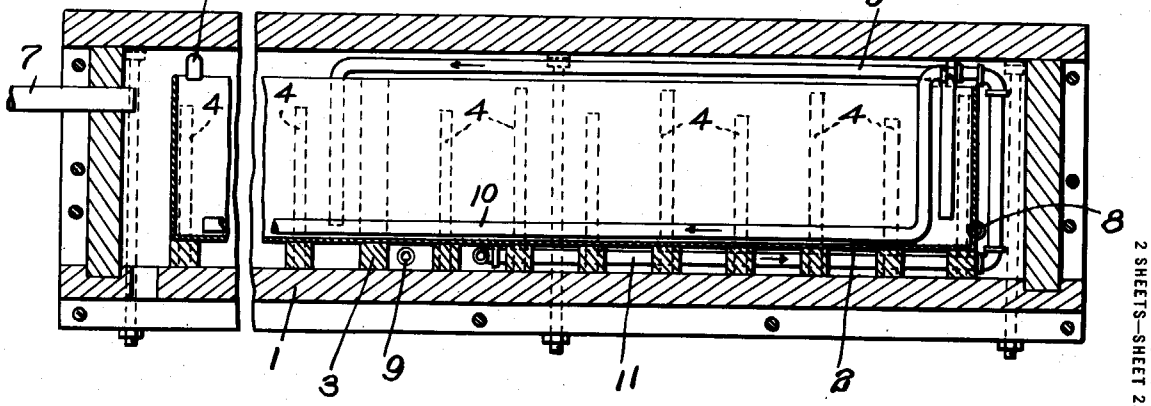
Figure 4:
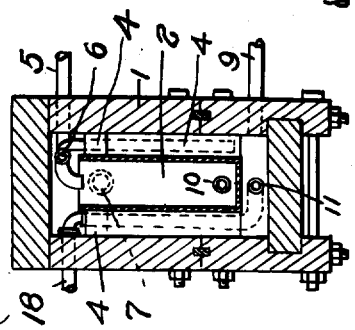

H. S. MARSH AND R. S. COCHRAN.

METHOD OF AND APPARATUS FOR RECLAIMING SPENT PICKLING SOLUTIONS.

APPLICATION FILED MAR. 28, 1921.

Reissued June 7, 1921. 15,119.

2 SHEETS—SHEET 1.

WITNESSES

J. Herbert Bradley

Francis J. Tomarson

INVENTORS

Henry S. Marsh

Rae S. Cochran by Christy and Christy their attorneys

H. S. MARSH AND R. S. COCHRAN.

METHOD OF AND APPARATUS FOR RECLAIMING SPENT PICKLING SOLUTIONS.

APPLICATION FILED MAR. 28, 1921.

Reissued June 7, 1921. 15,119.

2 SHEETS—SHEET 2.

WITNESSES

J. Hobart Bradley.

Francis J. Powanson

INVENTORS

Henry S. Marsh

Ralf S. Cochran by Christy and Christy their attorneys

UNITED STATES PATENT OFFICE.

HENRY S. MARSH AND RALF S. COCHRAN, OF YOUNGSTOWN, OHIO.

METHOD OF AND APPARATUS FOR RECLAIMING SPENT PICKLING SOLUTIONS.

15,119. Specification of Reissued Letters Patent. Reissued June 7, 1921.

Original No. 1,369,451, dated February 22, 1921, Serial No. 350,383, filed January 9, 1920. Application for reissue filed March 28, 1921. Serial No. 456,205.

*To all whom it may concern:*

Be it known that we, HENRY S. MARSH, and RALF S. COCHRAN, residing at Youngstown, in the county of Mahoning and State of Ohio, both citizens of the United States, have invented or discovered certain new and useful Improvements in Methods of and Apparatus for Reclaiming Spent Pickling Solutions, of which improvements the following is a specification.

Our invention relates to methods of and apparatus for reclaiming spent pickling solutions. The method, primarily intended for the purpose stated, is of wider applicability, as will eventually appear. The pickling operation which is widely practised in the steel-making industry, being incidental to all sorts of steel-working processes, is essentially an operation in which the surface of an iron or steel article is cleaned of oxid, corrosion, or scale, and left bright. The operation is accomplished by submerging the coated article in a bath of acid, ordinarily dilute sulfuric acid. Chemical reaction ensues, the underlying iron is attacked by the acid, and the oxid, corrosion, or scale is loosened and falls away, leaving exposed a clean surface of metallic iron. The chemical reaction produces a sulfate of iron ($FeSO_4 7H_2O$) known as copperas, which being soluble, is, from its formation carried in solution in the bath.

In present-day practice in steel mills, the pickling bath, the solution of acid in which the coated articles are immersed and cleaned, becomes, through continued operation, gradually enfeebled, slow in action, and ultimately exhausted. Acid of course is consumed is the pickling operation; and, as acid is consumed, new supplies of more concentrated acid are in present-day practice added from time to time to the bath. But, as a given body of solution continues in service, with such changes as have been indicated going on within it, and with additions made to it from time to time, a point is reached beyond which it is not desirable to proceed; a point is reached where addition of new supplies of concentrated acid cease to avail to restore the bath to vigor. This failure is due, manifestly, to the presence of copperas in solution; and, while according to our understanding it is not necessary to our application that theories be given, it is our belief that the phenomenon we have described, the increasing sluggishness of the bath and its increasing failure to respond to new additions of acid, is due to or connected with the law of mass action, whereby concentration either of the Fe element or of the SO, radical or of both effects a repression of ionization. But, whatever the cause, the phenomenon is plain, and it is to the overcoming of the difficulty here involved that our present invention is directed.

In present day practice the exhausted solution is thrown away as waste—not because its composition is unknown, nor because the components are valueless, but because the cost of recovery by recognized procedure is forbidding. Every reason is against such waste. The components are valuable, if only they can be recovered economically; and, in addition to that, the disposal of the waste often becomes a serious matter. If a steel mill be located where law forbids pollution of streams, the mill may be obliged even at financial loss to reclaim its spent pickling solution.

As we have said, the processes of reclamation are known. These earlier processes, however, so far as we are acquainted with them, are directed, all of them, primarily to the separation and recovery from the spent pickling solution of the copperas content. Our process as will presently appear, is primarily directed to the reclaiming of the dilute acid. Copperas, of course, has market value; the laws of crystallization, of course, are known. It is known that a salt may be precipitated from a solution by reducing the temperature till the line of saturation is crossed, and this principle has been applied, with the intention of recovering from spent pickling solutions their copperas content. A difficulty, however, is encountered, and it lies in this: that the crystals of copperas as they form tend to occlude in their mass pockets of the mother liquor. In consequence, the precipitate when obtained is a sludgy mass, of weak crystalline structure, permeated with dilute sulfuric acid. Further steps of purification have to be resorted to, and the result is that the reclaiming of the copperas has heretofore proved an unprofitable undertaking. Nevertheless, the laws against stream pollution, referred to above, have made it obligatory upon steel companies in some localities to practise even at a loss such operations of reclamation. It will be understood that, incidentally, the solution from which the copperas is taken, is itself partially consumed in the operation; indeed, as has been said, in existing operations of reclamation, the uncombined acid remaining in the bath is regarded as waste and is from this point forth dead loss.

Our invention regards the situation from another angle; our chief object is to reclaim the pickling solution and render it available and serviceable again; incidentally, we recover the copperas, by an economical method and in marketable condition.

We shall first describe apparatus, in the use of which, and in a single, continuous, and simple operation, we unburden the spent solution of its load of copperas, leaving it suitable for service again; while in so doing we separate out the copperas in commercially pure condition. This apparatus, in which we conduct a commercial operation, is so far provisional, that it contains features which would be modified, and lacks features which would be added, when it comes to building apparatus to take care of all the run of a large mill; but the essential features of our invention are herein illustrated, and upon this showing suitable bases for Letters Patent will be found. In the sequel, when we come to description of the operation of the apparatus, improvements in method will be indicated, wherein also there is patentable subject-matter.

Figure I of the drawings is a diagrammatic view, partly in side elevation, partly in longitudinal section of the apparatus just mentioned; Fig. II is a view in plan of the troughs which form part of the apparatus, as shown in Fig. I; Fig. III is a view in vertical and medial section, on the plane indicated by the line III—III, Fig. II; and Fig. IV is a vertical, transverse section, on the plane indicated at IV—IV, Fig. II.

The apparatus includes two troughs 1 and 2 arranged one within the other, with free space between on every side. These troughs are made of material such as to resist acid attack, and are further characterized by this: that the outer one is heat insulating in character and the inner heat-conducting. Accordingly, as indicated in the drawings, the outer trough is heavy-walled and made of wood, while the inner wall is thin-walled and made of lead. It might be made of other metal—Monel metal, for example. The space within the inner trough is continuous from end to end; the surrounding space within the outer trough and between it and the inner is divided, first, by a water-tight partition 3 which rises to the level of the upper edge of the inner trough, and then by other barriers designed to control circulation. These require a few words of more detailed description. It will be observed by studying Fig. III that the inner trough rests on a succession of cross pieces which raise it from the bottom of the outer trough; one of these, as will be seen, forms part of the water-tight partition 3 referred to. Each of the other cross pieces is continued in baffle plates 4 bridging the space between the side walls of the two troughs; these baffle plates are of two unequal heights, alternately arranged; and the relative arrangement on the two sides is staggered—that is to say, a high partition on one side and a low one on the other stand opposite. At this point the description of operation may be so far anticipated as to remark that the effect is to cause the liquid within the outer tank to circulate in a course indicated by the arrows in Fig. II—over a low baffle plate on one side, down, transversely beneath the inner trough between two of the supports, up, over a low baffle plate on the opposite side, down again, etc. This arrangement of baffle plates extends throughout the length of the outer trough, and on either side of partition wall 4.

Giving specific dimensions (to which, of course, our invention is not limited), the outer trough is in the installation which we are describing 16 feet 6 inches long overall, 14 inches wide, and 22 inches deep. The inner dimensions of this outer wooden trough are 15 feet 8 inches long, 8 inches wide, and 17 inches deep. The inner trough is 15 feet long, 4 inches wide, and 13 inches deep. The partition wall 3 mentioned above rises as has been said to the rim of the inner trough; that is to say, it is 15 inches high from the bottom of the outer trough. The baffles 4 mentioned rise alternately to the heights of 12 and 14 inches from the bottom of the outer trough. The inner trough is open above, the outer trough is closed, with a removable wooden cover. The partition 3 in the outer trough is in the actual apparatus which we are describing, and ordinarily it will be arranged nearer one end than the other. It stands 4 feet 1 inch from one end and 11 feet 5 inches from the other.

Operation may be regulated by providing a receiving tank 12 (Fig. I) for spent pickling solution. The pickling operation is conducted, as should have been earlier remarked, at elevated temperature, and a heater 13 may be provided to keep the liquid in the receiving tank at the desired temperature for introduction into the precipitating apparatus. Spent pickling solution is introduced into the inner trough through a supply pipe 5. A receiving tank being employed, the solution flows from it in continuous stream and at properly controlled rate, conveniently by gravity flow, through supply pipe 5, into inner trough 2, and at one end thereof—the end farther distant from partition 3.

From the opposite end of the inner trough the stream of liquid (from which, as will presently be explained, the burden of copperas has in its course through the inner trough been removed) is transferred to the outer trough at a point beyond the partition 3—that is to say, on the side of partition 3 toward the inlet and (which is the outlet end as well). The transference is conveniently effected through a siphon pipe 6, arranged as indicated in the drawings.

The outlet for the now reclaimed pickling solution is from the outer trough, at the end adjacent the inlet, through the pipe 7. The flow of pickling solution through the apparatus is conveniently by gravity throughout, and it will be understood that by arranging the outlet 7 at suitable height relatively to the height of the partition already described (cf. Fig. IV) the gravity flow desired may be effected; the level of pickling solution within the inner trough will be somewhat higher than in the outer trough, and, the rate of inflow through pipe 5 being properly adjusted, the siphon will automatically maintain the necessary difference in level. The serpentine course of the stream through the outer trough has been indicated in describing baffle plates 4.

Through the escape pipe 7 the reclaimed pickling solution may be carried directly back to the pickling vat, or it may conveniently accumulate in a suitable tank 14.

The portion of the outer trough at one side of partition 3, at the end opposite the inlet and outlet pipes, is not traversed by the solution, but it is occupied by a refrigerating medium. This medium will ordinarily, though not necessarily, be a circulating medium. This circulating refrigerating medium may be derived from suitable refrigerating apparatus 15 of any preferred sort. The ingress and egress of this circulating stream of refrigerating medium are indicated in pipe connections 8 and 9. In the inlet pipe 8 a pump 16 is indicated. The refrigerating medium will ordinarily be brine. Its course through the portion of the outer trough to which it gains access will, by virtue of the partitions 4 (the arrangement of these being the same throughout the length of the trough 1), be the serpentine course already described.

Apparatus for agitating the pickling solution while advancing through the inner trough, taking preferably the form of an air-spray, appears in the pipe 10 which extends along the bottom of the inner trough, substantially from end to end. It is a pipe of suitable material free from attack by acid, and is conveniently made of Monel metal. In the actual apparatus which we are describing, this pipe is a 1-inch pipe and drilled throughout its length with holes 1/64 of an inch in diameter, spaced at intervals of 4 inches. Air is supplied to this long, perforated pipe from a suitable source of supply, indicated diagrammatically as a compressed air tank 17 through pipe 18; from it a lead 11 extends, and, as shown in Figs. III and IV, this lead extends along the bottom of the outer trough 1, throughout such part of trough 1 as is filled with refrigerating medium, before it makes connection, over the end of trough 2, with the blow-pipe 10.

The operation carries into practice the method wherein our invention in part resides. Spent pickling solution enters trough 2 at one end through pipe 5 and at the other end is drawn off through siphon 6. While in trough 2, and throughout all the length of its gradual progress through trough 2, the body of the solution is constantly agitated by jets of inblown air, and throughout the length of the trough this advancing body is as will presently more clearly appear gradually cooled.

Our invention here does not end with cooling across the line of saturation of copperas in solution, nor is the whole story told in agitation during precipitation. We deal with actual temperatures, and within certain temperature limits results are attained which otherwise are not attainable. The spent solution as it comes from the pickling vats contains about 10% free acid, and copperas in such quantity that the line of saturation lies within the temperature ranges of our operation—from the temperature of pickling, 110° F., more or less, downward to about 20° F. The solution begins to freeze at about 21° F.

As the stream of spent pickling solution courses slowly through trough 2 from one end to the other, it grows gradually cold, and, as it cools, copperas is precipitated. When it is cooled to 20°, some ice separates. The ice crystals are of reasonably pure $H_2O$. These ice crystals float and do not mingle with the copperas crystals which meanwhile have been forming and falling to the bottom of the trough. At this temperature, below the freezing point, cooling through one degree will effect precipitation of as much copperas as a cooling through several degrees immediately above the freezing point. The reason, so far as we have discerned it, is that the separation of ice crystals has the effect of increasing the degree of concentration, both of copperas and of sulfuric acid, and thus a precipitation effect is obtained which is superadded to that due to cooling alone. Of course a point is quickly reached in the reduction of temperature, at which the quantity of floating ice crystals renders further cooling impracticable, and this point, varying somewhat— since we are dealing with a material of somewhat variable composition—is the point to which we carry the cooling. The temperature limit, then, to which in the practice of our invention, the liquid under treatment is brought will lie between the point where ice crystals begin to form (approximately 21° F.) and the point where accumulation of ice crystals, increasing as operation progresses, will interfere with the operation (this will be at a temperature one or two degrees below that first indicated). It should be said that the crystals of ice formed in the continually agitated liquid, are, as their formation begins, very thin; and they easily siphon over to the outer trough.

The cooling is effected by the refrigerating apparatus described, and ranges as has been said, from about 110° F., the temperature of the introduced liquid, to about 20° F., the temperature at which the liquid is carried through siphon 6 from the inner to the outer trough. Cooling effects precipitation, and agitation brings it about that the copperas crystallizes in small grains, which fall to the bottom of the trough, and lie there in a loose mass, from which when removed the liquid will drain away. And, as operation progresses, this granular crystalline mass is from time to time removed—scooped out, as we now operate. There is possibility here, of course, as elsewhere, for rearrangement and addition of instrumentalities for handling the material in large quantities in economical manner.

The cooling means have been alluded to. Cooling is primarily accomplished by a cooling medium (preferably a circulating medium) in the outer trough on one side of partion 3, but on the other side of the partition the cold, and now reclaimed pickling solution flows away to exit 7, and as it flows it is a secondary cooling medium, extracting heat from the pickling solution in trough 2 as the latter advances from the inlet toward the opposite end of the trough. The liquid in the inner trough is throughout the length of the trough giving up heat; the two bodies of liquid circulating in the outer trough 1 are absorbing heat from the liquid in inner trough 2. The two bodies of liquid in the outer trough circulate in serpentine course, back and forth across the outer surface of the inner trough—so that a maximum of heat transference is attained. The agitation of the liquid within trough 2 by cooled air tends to the same end.

Thus it will be seen that the stream of pickling solution is caused to flow in a loop, the return branch of the loop inclosing and continuing in heat transferring contact with the entering branch, and in the turn of the loop is a refrigerating apparatus. Provision is made for serpentine flow of the liquid in the return branch of the loop, while the liquid in the entering branch is constantly stirred and so sweeping the separating walls with eddy currents, in consequence of agitation within.

All the precipitation of copperas is effected within the inner trough. Agitation of the liquid within the inner trough, as precipitation progresses, has this further effect, that it prevents crystalline growth upon the side walls of the trough; for if the walls were to become coated with crystals, the conductivity of these walls for heat transference would be impaired.

Giving specific temperatures, the spent solution enters through conduit 5 at substantially 110° F., more or less; in consequence of cooling by the agencies indicated, the reclaimed solution leaves trough 2 at a temperature of about 20° F., and after traversing the outer trough it makes its exit at a temperature not far removed from the temperature of introduction, 100° F., more or less. The temperature at the partition 3 is, within the inner trough, approximately 30° F. From that point to the end of the trough, and within the region of direct action of the refrigeration apparatus, there is a fall of about 10°,—that is, to approximately 20° F. At this temperature the liquid is transferred from the inner to the outer trough and to a point beyond the partition, and, beginning its flow there at about 20° F., it finally emerges as has been said at a degree not far removed from the initial temperature.

The escaping liquid is dilute acid, practically free from copperas; the small quantity of copperas remaining is negligible. Ordinarily, this reclaimed solution will be of pickling strength (7 to 10%), at least. The solution in the pickling bath is initially of that strength; and when, as pickling progresses, new amounts of acid are added, they must be such in quantity that the percentage of acid shall rise for as copperas increases, a higher percentage of acid is needed in order to maintain a practicable rate of action within the pickling bath. According to present-day practice this percentage of acid may increase to 20%; in our operation, the pickling capacity of the bath would not be forced to this limit; freshly purified solution would constantly be available; and the strength of the acid in solution would not be carried beyond 10–15%. The copperas, when precipitated, carries with it water of crystallization. It is for these reasons that the solution when reclaimed will be of more than requisite strength for pickling.

Viewed as a whole, it will be seen that, while the copperas is removed, only a portion of the excess heat is removed from the solution; the reclaimed solution passes on still heated, and requiring but relatively small heat additions, to bring it again to pickling temperature. It is manifest that in the practice of our invention pickling solution may circulate through pickling vat and reclaiming apparatus in continuous stream.

In our operation practically all the acid is accounted for, either in the form of copperas, or in acid returned from the reclaiming apparatus to the pickling vat.

It should have been said in proper place, although it will be understood by those who practise the art, that, upon withdrawing the spent pickling solution from the vat, and before introducing it in the reclaiming apparatus, it will have to be filtered, in order to separate from it solid particles of iron oxid, sawdust and such other matter as may incidentally accumulate in the pickling bath.

We have now described the invention in its application to the specific problem of reclaiming spent pickling solution. As we intimated in the beginning, and as is now manifest, the invention is applicable to solutions generally, and will be found advantageous, wherever the desirability appears of obtaining precipitation with a minimum of loss of heat.

We claim as our invention:

1. The method herein described of reclaiming spent pickling solutions which consists in causing hot solution to flow in a stream, cooling the solution at an intermediate point in the course of the stream, and in transferring heat from the solution at one portion of such stream to the solution at another portion, whereby precipitation is effected in the portion whence heat is taken.

2. The method herein described of reclaiming a spent pickling solution which consists in causing the solution to flow counter current in loop form, the branches of the loop in heat-interchanging relation one to the other, applying refrigeration to the turn of the loop, and agitating the solution as it advances along the inflow branch of the loop with inblown cool air.

3. The method herein described of reclaiming spent pickling solutions, which consists in causing the solution to flow counter current in loop form, the branches of the loop in heat interchanging relation one to the other, and applying refrigeration to the turn of the loop.

4. The herein described method of reclaiming spent pickling solutions, which consists in causing the solution to flow counter current in loop form, the branches of the loop in heat interchanging relation one to the other, applying refrigeration to the turn of the loop, and agitating the solution as it advances along the inflow branch of the loop.

5. In apparatus for reclaiming spent pickling solution, the combination of a conduit through which the solution flows in loop form, the branches of the loop being separated by a partition of heat-conducting material, and means for refrigerating the solution as it passes through the turn of the loop, substantially as described.

6. In apparatus for reclaiming spent pickling solution, the combination of a conduit through which the solution flows in loop form, the branches of the loop being separated by a partition of heat-conducting material, means for refrigerating the solution as it passes through the turn of the loop, and means for agitating the solution as it flows in the intake branch of the loop, substantially as described.

7. Apparatus for the reclaiming of spent pickling solutions including two troughs arranged one within the other with a space between, the inner being formed of heat-transmitting material, a dam across the outer trough at a point intermediate its length, refrigerating means located in the outer trough on one side of said dam, and connection from the inner trough to the outer at a point in the outer trough on the side of the dam opposite that where the refrigerating means are located, substantially as described.

8. Apparatus for the reclaiming of spent pickling solutions including two troughs arranged one within the other with a space between, the inner being formed of heat-transmitting material, a dam across the outer trough at a point intermediate its length, refrigerating means located in the outer trough on one side of said dam, connection from the inner trough to the outer at a point in the outer trough on the side of the dam opposite that where the refrigerating means are located, means for introducing the solution to the inner trough, and for conducting it away from the outer trough, and means for agitating the solution within the inner trough, substantially as described.

9. Apparatus for the reclaiming of spent pickling solutions including two troughs arranged one within the other with a space between, the inner being formed of heat-transmitting material, a dam across the outer trough at a point intermediate its length, refrigerating means located in the outer trough on one side of said dam, connection from the inner trough to the outer at a point in the outer trough on the side of the dam opposite that where the refrigerating means are located, means for introducing the solution to the inner trough, and for conducting it away from the outer trough, an air conductor leading through the refrigerating means in the outer trough and thence to the inner trough and being there provided with an escape orifice, substantially as described.

10. Apparatus for reclaiming spent pickling solutions including two troughs arranged one within the other with a space between, a succession of strips set in the bottom of the outer trough and upon which the inner rests, and a corresponding succession of pairs of baffle plates arranged in the spaces between the side walls of the troughs forming vertical continuations of said strips, every second plate in succession longitudinally of the troughs being lower than those immediately adjacent and plates of each pair being unequal in height, substantially as described.

11. Apparatus for reclaiming spent pickling solutions including two troughs arranged one within the other with a space between, the inner being formed of heat-conducting material, a dam across the outer trough at a point intermediate its length, means within the outer trough on one side of said partition for effecting cooling of solution within the inner trough, and a siphon leading from the end of the inner trough where the cooling means are located to the outer trough on the other side of the partition, substantially as described.

12. Apparatus for reclaiming spent pickling solutions including two troughs arranged one within the other with a space between, the inner being formed of heat-transmitting material, a dam across the outer trough at one side said dam, connection from the inner trough to the outer at a point in the outer trough on the side of the dam opposite that where the refrigerating means are located, an air pipe leading through the refrigerating means in the outer trough and extending into the inner trough, and there provided with a vent orifice, substantially as described.

13. The method herein described of treating a solution which consists in causing the solution to flow in a stream, effecting precipitation by withdrawing heat from the solution at one point in the course of the stream, and transferring the heat so withdrawn and restoring it again to the liquid at a lower point in the course of the stream.

14. The method herein described of treating a solution which consists in causing the solution to flow counter current in loop form, the branches of the loop in heat interchanging relation one to the other, and cooling the stream at the turn of the loop.

HENRY S. MARSH.
RALF S. COCHRAN.